(12) United States Patent
Prasad et al.

(10) Patent No.: US 10,567,039 B2
(45) Date of Patent: Feb. 18, 2020

(54) PACKET COMMUNICATION TO FACILITATE WIRELESS CHARGING OF ELECTRIC VEHICLES

(71) Applicant: GM Global Technology Operations LLC, Detroit, MI (US)

(72) Inventors: Rashmi Prasad, Troy, MI (US); Lakshmi V. Thanayankizil, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 142 days.

(21) Appl. No.: 15/730,079

(22) Filed: Oct. 11, 2017

(65) Prior Publication Data
US 2019/0105995 A1    Apr. 11, 2019

(51) Int. Cl.
| | |
|---|---|
| *H02J 7/02* | (2016.01) |
| *H04B 5/00* | (2006.01) |
| *B60L 53/12* | (2019.01) |
| *B60L 55/00* | (2019.01) |
| *B60L 53/63* | (2019.01) |
| *B60L 53/65* | (2019.01) |
| *H02J 50/10* | (2016.01) |
| *H02J 50/90* | (2016.01) |
| *H02J 5/00* | (2016.01) |

(52) U.S. Cl.
CPC ............ *H04B 5/0037* (2013.01); *B60L 53/12* (2019.02); *B60L 53/63* (2019.02); *B60L 53/65* (2019.02); *B60L 55/00* (2019.02); *H02J 5/005* (2013.01); *H02J 7/025* (2013.01); *H02J 50/10* (2016.02); *H02J 50/90* (2016.02); *B60W 2550/408* (2013.01)

(58) Field of Classification Search
CPC ...................................................... H02J 7/025
USPC ......................................................... 320/108
See application file for complete search history.

(56) References Cited

U.S. PATENT DOCUMENTS

| | | | | |
|---|---|---|---|---|
| 10,272,793 | B2* | 4/2019 | Perry | G01C 21/3614 |
| 2013/0024306 | A1* | 1/2013 | Shah | G06Q 20/32 |
| | | | | 705/17 |
| 2015/0306969 | A1* | 10/2015 | Sabripour | G06Q 30/00 |
| | | | | 320/109 |
| 2016/0176302 | A1* | 6/2016 | Boyer | B60L 11/182 |
| | | | | 320/108 |
| 2018/0174139 | A1* | 6/2018 | Arora | G06Q 20/367 |
| 2018/0343608 | A1* | 11/2018 | Duan | H04W 48/16 |
| 2019/0097440 | A1* | 3/2019 | Wu | H02J 7/00 |

* cited by examiner

*Primary Examiner* — Edward Tso
*Assistant Examiner* — Ahmed H Omar
(74) *Attorney, Agent, or Firm* — Cantor Colburn LLP

(57) ABSTRACT

A system and method of facilitating wireless charging of an electric vehicle (EV) include the EV performing service discovery and negotiation via a neighborhood aware network (NaN) to determine charging compatibility of a WiFi enabled charging station or another EV with the EV. The method also includes the EV requesting a reservation from the charging station or a charge from the another EV based on determining that the EV is compatible with the charging station or the another EV by broadcasting a request message that includes a packet with the request via the NaN.

18 Claims, 2 Drawing Sheets

PACKET COMMUNICATION TO FACILITATE WIRELESS CHARGING OF ELECTRIC VEHICLES

INTRODUCTION

The subject disclosure relates to packet communication to facilitate wireless charging of electric vehicles (EVs).

EVs (e.g., automobiles, farm equipment, construction equipment) are becoming increasingly popular. As such, the infrastructure needed to support such vehicles is continuing to be developed. Wireless charging stations for EVs are among the emerging technologies. The wireless charging stations may use WiFi to both communicate with and charge the EVs. The wireless charging stations may use WiFi for communication and provide inductive charging to EVs using an electromagnetic field to transfer energy. While a gas station's occupancy is a good indicator of the wait time because of the one-to-one correspondence between each car and each gas pump, the wait time at an EV charging station can be difficult to estimate. In addition, the vehicle class type that can be serviced by a given charging station and its power capability may not be apparent. Thus, a charging station may broadcast information over the WiFi Neighbor Aware Network (NaN). While the broadcast information can provide general information regarding the charging station (e.g., power capability) to vehicles within the NaN communication range (e.g., less than a mile), that one-way communication may be insufficient to facilitate efficient charging. Accordingly, it is desirable to provide packet communication to facilitate wireless charging of EVs.

SUMMARY

In one exemplary embodiment, a method of facilitating wireless charging of an electric vehicle (EV) includes the EV performing service discovery and negotiation via a neighborhood aware network (NaN) to determine charging compatibility of a WiFi enabled charging station or another EV with the EV. The method also includes the EV requesting a reservation from the charging station or a charge from the another EV based on determining that the EV is compatible with the charging station or the another EV by broadcasting a request message that includes a packet with the request via the NaN.

In addition to one or more of the features described herein, the charging station broadcasts a message via the NaN. The message indicates a charging service provided by the charging station.

In addition to one or more of the features described herein, the charging station broadcasting the message includes the charging station indicating vehicle classes supported by the charging station, a power capability of the charging station, preferred payment method, alignment support capability, charging rate or cost, or a current wait time for charging at the charging station.

In addition to one or more of the features described herein, the EV requests compatibility information from the charging station or the another EV via an information request packet in an information request message broadcast via the NaN. The compatibility information includes vehicle classes supported by the charging station or the another EV and a power capability of the charging station or the another EV.

In addition to one or more of the features described herein, the charging station or the another EV provides the compatibility information in an information message broadcast via the NaN.

In addition to one or more of the features described herein, the EV obtains a maximum acceptable wait time from an operator of the EV.

In addition to one or more of the features described herein, the determining the compatibility of the charging station with the EV includes determining whether a current wait time indicated by the charging station is less than the maximum acceptable wait time indicated by the operator.

In addition to one or more of the features described herein, the determining the compatibility of the charging station or the another EV with the EV includes determining whether vehicle classes supported by the charging station or the another EV and power capability of the charging station or the another EV match a vehicle class of the EV and power requirements of the EV.

In addition to one or more of the features described herein, the EV obtains the reservation from the charging station via a reservation message broadcast via the NaN and establishes a connection to complete the wireless charging. The connection is via a network other than the NaN.

In addition to one or more of the features described herein, the packet in the request message is encrypted.

In another exemplary embodiment, a system to facilitate wireless charging of an electric vehicle (EV) includes a battery of the EV, and a controller of the EV. The controller performs service discovery and negotiation via a neighborhood aware network (NaN) to determine compatibility of a WiFi enabled charging station or another EV with the EV and request a reservation from the charging station or the another EV based on determining that the EV is compatible with the charging station or the another EV. The request is sent as a request message that includes a packet via the NaN.

In addition to one or more of the features described herein, the charging station is configured to broadcast a message via a neighborhood aware network (NaN), the message indicating a charging service provided by the charging station.

In addition to one or more of the features described herein, the message broadcast by the charging station includes an indication of vehicle classes supported by the charging station, a power capability of the charging station, preferred payment method, alignment support capability, charging rate or cost, or a current wait time for charging at the charging station.

In addition to one or more of the features described herein, the controller is further configured to request compatibility information from the charging station or the another EV via an information request packet in an information request message broadcast via the NaN, wherein the compatibility information includes vehicle classes supported by the charging station or the another EV and a power capability of the charging station or the another EV.

In addition to one or more of the features described herein, the controller is further configured to receive the compatibility information from the charging station or the another EV in an information message broadcast via the NaN.

In addition to one or more of the features described herein, the controller is further configured to obtain a maximum acceptable wait time from an operator of the EV.

In addition to one or more of the features described herein, the controller is further configured to determine the compatibility of the charging station with the EV by determining whether a current wait time indicated by the charging station is less than the maximum acceptable wait time indicated by the operator.

In addition to one or more of the features described herein, the controller is further configured to determine the compatibility of the charging station or the another EV with the EV by determining whether vehicle classes supported by the charging station or the another EV and power capability of the charging station or the another EV match a vehicle class of the EV and power requirements of the EV.

In addition to one or more of the features described herein, the controller is further configured to obtain the reservation from the charging station via a reservation message broadcast via the NaN and to establish a connection to complete the wireless charging via a network other than the NaN.

In addition to one or more of the features described herein, the controller is further configured to encrypt the packet in the request message.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
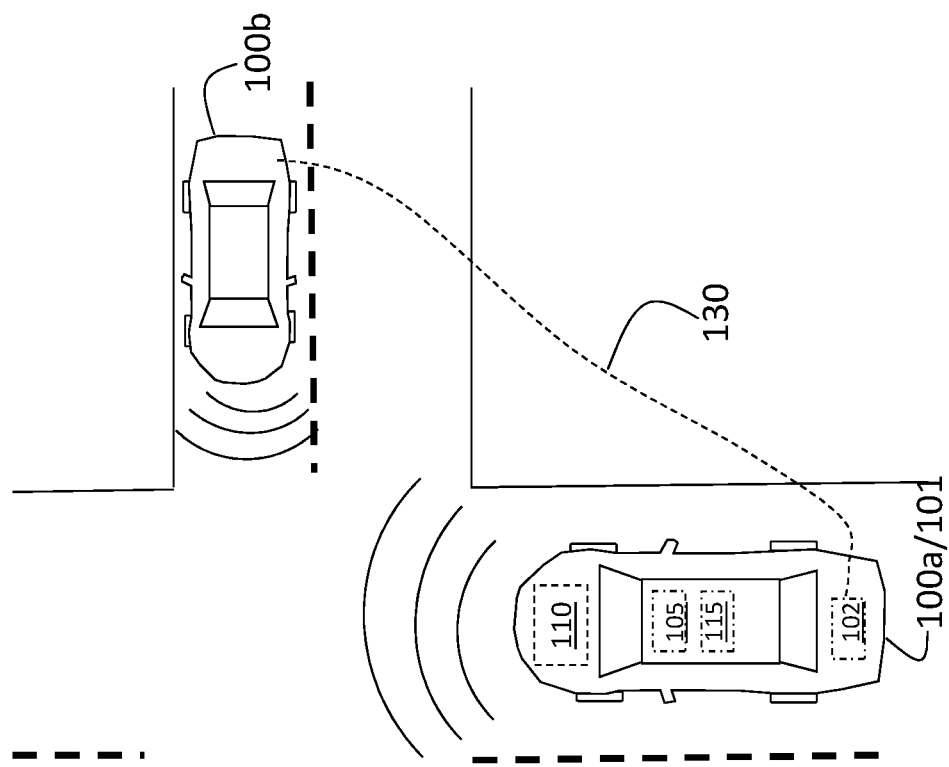
FIG. 1 is a block diagram of an exemplary electric vehicle that performs packet communication to facilitate wireless charging according to one or more embodiments.
Figure 1:
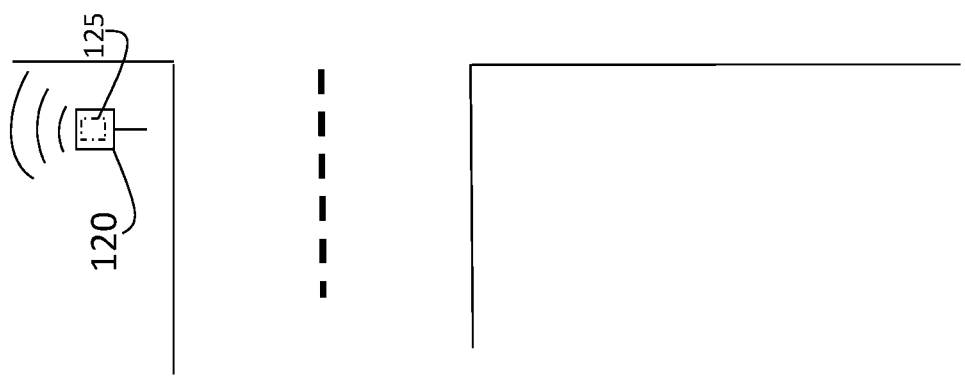

The following description is merely exemplary in nature and is not intended to limit the present disclosure, its application or uses. It should be understood that throughout the drawings, corresponding reference numerals indicate like or corresponding parts and features.

As previously noted, a vehicle charging station may broadcast information via the NaN. Thus, the vehicle charging station acts as a NaN terminal. The information that is broadcast may be insufficient to efficiently establish and complete the charging process. Thus, a particular EV may need to request additional information, for example. The information does not facilitate a transaction between the charging station and a particular EV. Thus, a particular EV may need to reserve a spot at the charging station, for example.

Embodiments of the systems and methods detailed herein relate to packet communication to facilitate wireless charging of EVs. More particularly, the embodiments are directed to packet communication via the NaN to perform service discovery and negotiation between an EV and a charging station or another EV that can provide a charge before establishing the WiFi connection needed to perform the charging. According to one or more embodiments, communication via the NaN that is already used by a vehicle charging station may be leveraged to facilitate the negotiation and establishment of a transaction between a particular EV and the charging station. In this vehicle-to-infrastructure (V2I) communication, packets are embedded in the same NaN frame used by the charging station to broadcast information. In additional embodiments, communication via the NaN may facilitate vehicle-to-vehicle (V2V) communication that allows one EV to request a charge from another either wirelessly or via a battery-to-battery connection. Packets may be embedded and transmitted by WiFi-enabled vehicles (e.g., EVs). The packets include encryption that is known to compatible charging stations and other compatible EVs. Thus, a receiving compatible charging station or EV within communication range of the NaN frame will receive the message and decrypt the packet. The response by the charging station may be part of its next broadcast or, as among the EVs, may be in a packet directed to compatible EVs that know the encryption scheme. A WiFi connection is not established to perform the charging unless the negotiations via the packet communication using the NaN are successful.

In accordance with an exemplary embodiment, FIG. 1 is a block diagram of an exemplary EV 100a that performs packet communication to facilitate wireless charging. The EV 100a in the exemplary case is an automobile 101 and includes a battery 102. The EV 100a may include several radio access technologies (RATs) 110 such as those that provide access to cellular, Bluetooth, or designated short range communication (DSRC). Multiple cellular RATs may be available (e.g., fourth generation long term evolution (4G LTE), fifth generation millimeter wave (5G mmWave)) and more than one Bluetooth client may be supported simultaneously. The EV 100a is shown in FIG. 1 with a WiFi RAT 110. The WiFi RAT 110 facilitates communication of encrypted packets via the NaN.

The EV 100a is also shown with an infotainment system 105 that facilitates interaction between the EV 100a systems and an operator (e.g., driver) and a controller 115 that may be coupled to one or more vehicle systems including the infotainment system 105 and WiFi RAT 110 to make decisions about charging of the vehicle. The controller 115 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A second EV 100b is shown in FIG. 1. This second EV 100b is compatible with the EV 100a. That is, EV 100a and EV 100b can communicate over the NaN by using the same encryption scheme. The EVs 100a, 100b may be generally referred to as EV 100. For explanatory purposes, EV 100a is discussed herein as an EV 100 that seeks charging while EV 100b is discussed herein as an EV 100 that may provide a charge. As such, the EV 100a may broadcast the need for a charge using the NaN. In response or generally, the EV 100b may broadcast a willingness to provide a charge. The communication between EV 100a and EV 100b may ultimately facilitate wireless charging via a WiFi connection or charging via a battery-to-battery physical connection 130 indicated in FIG. 1. The communication between the two EVs 100 is further discussed with reference to FIG. 2.

A charging station 120 with WiFi communication capability is also shown in FIG. 1. The charging station 120 (i.e., the NaN terminal) includes an omnidirectional antenna 125 and may send messages (i.e., service discovery frames) continuously in the background so that a counterpart system such as the EV 100a can discover the charging station 120. In alternate embodiment, the charging station 120 may default to a sleep mode in which it does not send messages but receives messages continuously and transitions to a wake mode based on an EV 100a sending a service discovery message in search of a charging station 120. According to either embodiment (e.g., continuously, upon entering the wake mode), the charging station 120 may broadcast information in a NaN frame, referred to as a service discovery frame, for example. The information may include the vehicle classes that it supports, its power capability, preferred payment method, alignment support capability, charging rate or cost, or the current wait time based on currently charging vehicles, vehicles with reservations, and their levels of charge.

Upon receiving broadcast information from the charging station 120, the controller 115 of the EV 100*a* may make several determinations regarding its compatibility with the charging station 120 according to one or more embodiments. For example, the operator of the EV 100*a* may indicate a maximum wait time through the infotainment system 105 directly or via a smart device paired to the vehicle 100. Thus, the controller 115 may determine if the wait time broadcast by the charging station 120 is within the maximum wait time indicated in the infotainment system 105. The controller 115 may additionally determine if the class of the EV 100*a* is among the supported vehicle classes indicated by the broadcast of the charging station 120. The controller 115 may also determine if the power capability of the charging station 120, as indicated in the broadcast, is sufficient to charge the EV 100*a*.

Based on the determinations regarding compatibility, if the controller 115 determines that the EV 100*a* should be charged by the charging station 120, the EV 100*a* may send a message to the charging station 120 requesting a charge—i.e., a request for an immediate engagement or association to the charging station 120—(in the case of no wait) or requesting a reservation (in the case of a wait). The message from the EV 100*a* to the charging station 120 may be in the form of an encrypted packet embedded in a broadcast NaN frame that is similar to the service discovery frame broadcast by the charging station 120. The encryption may use an existing encryption scheme or a customized encryption scheme that is known by EVs 100*a* of a particular manufacturer and by compatible charging stations 120, for example.

Once the request for a reservation or immediate charging has been sent by the EV 100*a*, it represents the completion of the service discovery and selection. At this point, the communication via NaN would be replaced by communication via a WiFi connection or another type of connection (e.g., global positioning system (GPS), cellular, hotspot). The initial communication to determine compatibility in the needs of the EV 100*a* and the capability of the charging station 120, which is accomplished via the NaN without requiring a connection session, uses minimal power and bandwidth. As a result, the service discovery and negotiation may be performed even in crowded environments or areas without cellular or hotspot connectivity.

Figure 2:
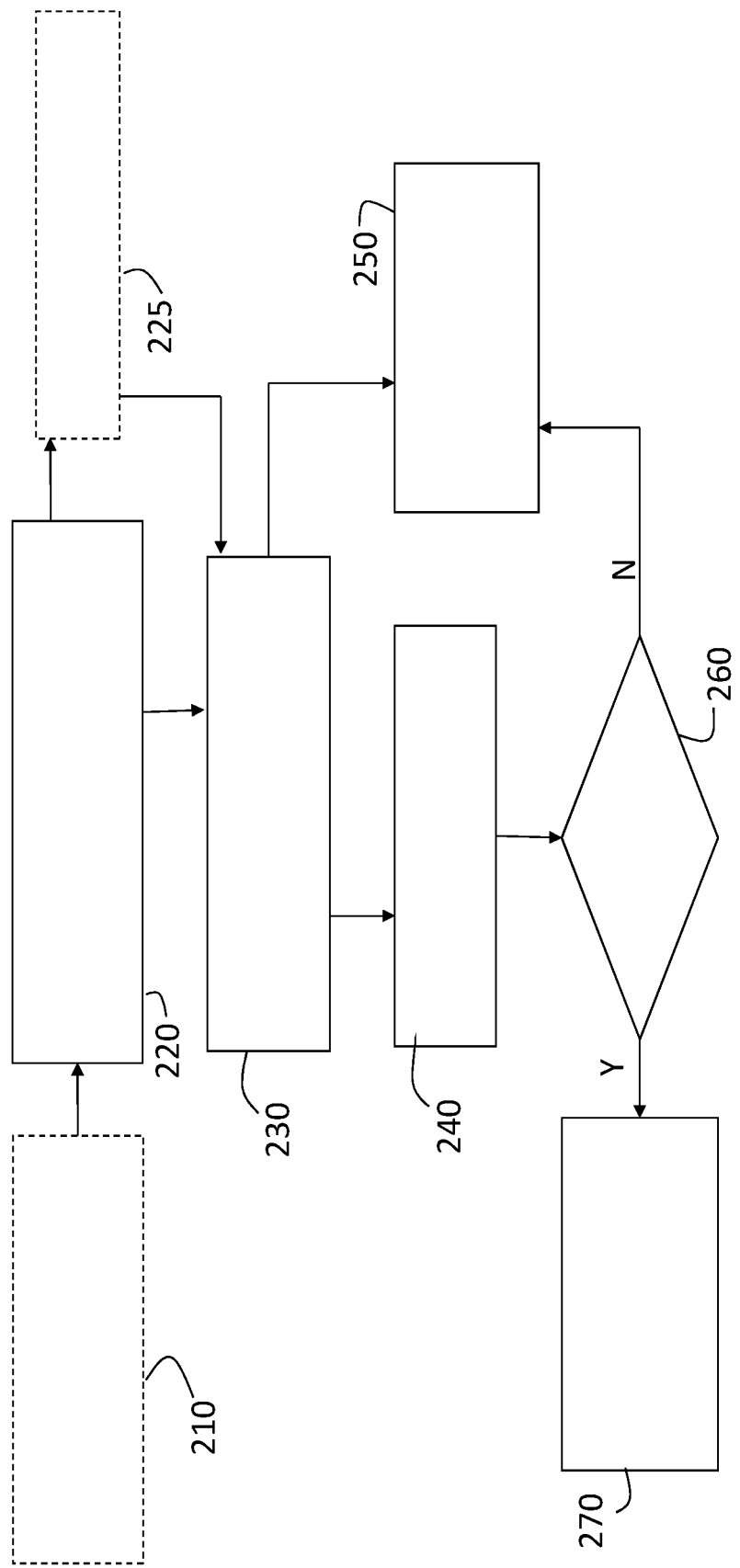
FIG. 2 is a process flow of a method of facilitating wireless charging of an electric vehicle according to two or more embodiments.

FIG. 2 is a process flow of a method of facilitating wireless charging of an EV 100*a* according to one or more embodiments. At block 210, the EV 100*a* broadcasting a service request is an optional process to wake up a charging station 120 that may be in a sleep mode as a default or to get a response from compatible EVs 100*b* within communication range. At block 220, the charging station 120 or compatible EV 100*b* broadcasting a service discovery frame refers to the charging station 120 or compatible EV 100*b* indicating information such as its power capability and the vehicle types that it is compatible with. The charging station 120 may additionally broadcast the current wait time. The compatible EV 100*b* may additionally broadcast its charging rate, because the compatible EV 100*b* may require a fee for the charging (e.g., the compatible EV 100*b* is a roaming charging station) or may be free as a favor among fellow EV 100 drivers.

In alternate embodiments, the EV 100*a* and the charging station 120 may perform additional communication, at block 225, in order for the EV 100*a* to determine the wait time at the charging station 120. The EV 100*a* may request wait time information by embedding an encrypted packet with the request into a NaN message frame. The charging station 120 may broadcast the wait time information in response, for example.

At block 230, the EV 100*a* determining compatibility includes the controller 115 of the EV 100*a* determining if the class of the EV 100*a* and its power requirements match the class compatibility and power capability indicated by the charging station 120 or the compatible EV 100*b*. The determining, at block 230, may additionally include the controller 115 obtaining maximum acceptable wait information from an operator via the infotainment system 105 and comparing that maximum wait time with the wait time indicated by the charging station. The determining, at block 230, may additionally include the controller 115 obtaining a maximum acceptable charging fee from the operator, as well. The determination at block 230 may lead to continuing the search for a charging station 120 at block 250 when the charging station 120 or compatible EV 100*b* is found to be unsuitable for any reason, at block 230. The determination, at block 230, may instead lead to the EV 100*a* requesting a reservation for a charge (or immediate charge request based on the wait time) from the charging station 120 or a request for a charge from the compatible EV 100*b*, at block 240.

At block 260, the controller 115 of the EV 100*a* determines whether the reservation that was requested at block 240 was given by the charging station 120 or the request for charging to the compatible EV 100*b* solicited a positive response. If a reservation was not given or a charge request was denied, then continuing the search for a charging station 120 at block 250 is performed. If a reservation was given by the charging station 120 or a request was granted by a compatible EV 100*b*, then establishing the connection for charging, at block 270, includes the EV 100*a* and the charging station 120 or the compatible EV 100*b* completing the processes to prepare for the charging process (i.e., completing communication via the NaN) and then completing the charging by establishing a different connection. As previously noted, charging may be through a physical connection 130 or may be wireless. When the charging is wireless, the WiFi connection need not be established until block 270, when compatibility and availability has already been established.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of facilitating wireless charging of an electric vehicle (EV), the method comprising:

the EV performing service discovery and negotiation via a neighborhood aware network (NaN) to determine charging compatibility of a WiFi enabled charging station or another EV with the EV;

the EV requesting compatibility information from the charging station or the another EV via an information request packet in an information request message broadcast via the NaN, wherein the compatibility information includes vehicle classes supported by the charging station or the another EV and a power capability of the charging station or the another EV; and the EV requesting a reservation from the charging station or a charge from the another EV based on determining that the EV is compatible with the charging station or the another EV by broadcasting a request message that includes a packet with the request via the NaN.

2. The method according to claim 1, further comprising the charging station broadcasting a message via the NaN, wherein the message indicates a charging service provided by the charging station.

3. The method according to claim 2, wherein the charging station broadcasting the message includes the charging station indicating vehicle classes supported by the charging station, a power capability of the charging station, preferred payment method, alignment support capability, charging rate or cost, or a current wait time for charging at the charging station.

4. The method according to claim 1, further comprising the charging station or the another EV providing the compatibility information in an information message broadcast via the NaN.

5. The method according to claim 1, further comprising the EV obtaining a maximum acceptable wait time from an operator of the EV.

6. The method according to claim 5, wherein the determining the compatibility of the charging station with the EV includes determining whether a current wait time indicated by the charging station is less than the maximum acceptable wait time indicated by the operator.

7. The method according to claim 1, wherein the determining the compatibility of the charging station or the another EV with the EV includes determining whether vehicle classes supported by the charging station or the another EV and power capability of the charging station or the another EV match a vehicle class of the EV and power requirements of the EV.

8. The method according to claim 1, further comprising the EV obtaining the reservation from the charging station via a reservation message broadcast via the NaN and establishing a connection to complete the wireless charging, wherein the connection is via a network other than the NaN.

9. The method according to claim 1, further comprising encrypting the packet in the request message.

10. A system to facilitate wireless charging of an electric vehicle (EV), the system comprising:

a battery of the EV; and a controller of the EV configured to perform service discovery and negotiation via a neighborhood aware network (NaN) to determine compatibility of a WiFi enabled charging station or another EV with the EV and request a reservation from the charging station or the another EV based on determining that the EV is compatible with the charging station or the another EV, wherein the request is sent as a request message that includes a packet via the NaN, wherein the controller is further configured to request compatibility information from the charging station or the another EV via an information request packet in an information request message broadcast via the NaN, wherein the compatibility information includes vehicle classes supported by the charging station or the another EV and a power capability of the charging station or the another EV.

11. The system according to claim 10, wherein the charging station is configured to broadcast a message via a neighborhood aware network (NaN), the message indicating a charging service provided by the charging station.

12. The system according to claim 11, wherein the message broadcast by the charging station includes an indication of vehicle classes supported by the charging station, a power capability of the charging station, preferred payment method, alignment support capability, charging rate or cost, or a current wait time for charging at the charging station.

13. The system according to claim 10, wherein the controller is further configured to receive the compatibility information from the charging station or the another EV in an information message broadcast via the NaN.

14. The system according to claim 10, wherein the controller is further configured to obtain a maximum acceptable wait time from an operator of the EV.

15. The system according to claim 14, wherein the controller is further configured to determine the compatibility of the charging station with the EV by determining whether a current wait time indicated by the charging station is less than the maximum acceptable wait time indicated by the operator.

16. The system according to claim 10, wherein the controller is further configured to determine the compatibility of the charging station or the another EV with the EV by determining whether vehicle classes supported by the charging station or the another EV and power capability of the charging station or the another EV match a vehicle class of the EV and power requirements of the EV.

17. The system according to claim 10, wherein the controller is further configured to obtain the reservation from the charging station via a reservation message broadcast via the NaN and to establish a connection to complete the wireless charging via a network other than the NaN.

18. The system according to claim 10, wherein the controller is further configured to encrypt the packet in the request message.

* * * * *